(12) United States Patent
Tanaka

(10) Patent No.: US 6,522,971 B1
(45) Date of Patent: Feb. 18, 2003

(54) INFORMATION INPUT/OUTPUT SYSTEM FOR OFFERING VARIOUS SERVICES TO A USER TERMINAL THROUGH A COMMUNICATION NETWORK

(75) Inventor: Toshiaki Tanaka, Fukaya (JP)

(73) Assignee: Toshiba Tec Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 09/618,094

(22) Filed: Jul. 17, 2000

(51) Int. Cl.[7] .......................... G01C 21/30; G08G 1/123
(52) U.S. Cl. ........................................ 701/209; 340/995
(58) Field of Search .................................. 701/200–202, 701/205–211, 213, 224, 300; 342/450, 451, 457–458, 357.01, 357.06–357.09, 357.12–357.15; 340/425.5, 459–465, 473–475, 988–996; 455/412–413; 358/1.1, 402, 403–404, 407, 441, 442, 444

(56) References Cited

U.S. PATENT DOCUMENTS

| 5,559,707 A | * | 9/1996 | DeLorme et al. ........... 701/200 |
| 5,959,577 A | * | 9/1999 | Fan et al. .............. 342/357.13 |
| 6,128,571 A | * | 10/2000 | Ito et al. ...................... 701/201 |
| 6,259,405 B1 | * | 7/2001 | Stewart et al. .............. 342/457 |
| 6,314,365 B1 | * | 11/2001 | Smith .......................... 701/200 |

FOREIGN PATENT DOCUMENTS

| JP | 10-021498 | * | 1/1998 | ......... G08G/1/0969 |

* cited by examiner

Primary Examiner—Thu Nguyen
(74) Attorney, Agent, or Firm—Foley & Lardner (57) ABSTRACT

A service center for offering various services through a communication network, a plurality of service stations for transmitting/receiving information to/from the service center through the communication network, and a user terminal for transmitting/receiving information to/from the service center or the service station through the communication network are provided. An optimum service station is selected based on a service request from the user and the user is led to that service station, the user can reach a specific service station in a short period of time without going astray. Further, when an optimum service station is distanced away, detailed map information is provided to the user at a relay point, and the user can be hence safely and assuredly led irrespective of a position of the service station.

15 Claims, 9 Drawing Sheets

DATABASE INFORMATION IN SERVICE CENTER

SPECIFICATION INFORMATION OF PRINTER
    (1) MANUFACTURER NAME AND MODEL NAME OF COPIER OR PRINTER
    (2) DISTINCTION BETWEEN MONOCHROME/COLOR
    (3) PRINT SPEED (NUMBER OF PRINT COPIES/MIN)
    (4) TYPE OF PRINTABLE PAPER=AVAILABILITY OF SORT ACCORDING TO PAPER SIZE AND THICKNESS
    (5) AVAILABILITY OF GROUP
    (6) AVAILABILITY OF STAPLE
    (7) AVAILABILITY OF SECURITY FUNCTION
    (8) TYPE OF SECURITY FUNCTION
DOWN & UPLOAD SERVICE INFORMATION
SERVICE UTILIZATION FEE INFORMATION
SERVICE OPERATING SCHEDULE INFORMATION
INFORMATION OF ACCESS POINT CLOSEST TO SERVICE STATION

TRAFFIC INFORMATION

| STORE | DISTANCE | GOOD α | GOOD β | GOOD γ |
|---|---|---|---|---|
| A STORE | d1 | $#### | $#### | $#### |
| B STORE | d2 | $#### | $#### | $#### |
| C STORE | d3 | $#### | $#### | $#### |

FIG. 11A

| STORE | DISTANCE | PRICE OF HAIRCUT |
|---|---|---|
| X | d4 | $#### |
| Y | d5 | $#### |
| Z | d6 | $#### |

FIG. 11B

INFORMATION INPUT/OUTPUT SYSTEM FOR OFFERING VARIOUS SERVICES TO A USER TERMINAL THROUGH A COMMUNICATION NETWORK

BACKGROUND OF THE INVENTION (i) Field of the Invention

The present invention relates to an information input/output system for receiving various services from a user terminal through a communication network.

(ii) Description of the Related Art

In recent years, a mobile phone or a PHS (Personal Handy phone System) is not only used as a telephone terminal but increasingly used for transmission/reception of emails or connection to the internet. Further, a communication function is now normally attached to an electronic databook or a notebook computer.

This kind of mobile communication device is often provided with a small liquid crystal display. However, since a display area of a screen is narrow, an amount of information which can be displayed in one screen is limited, and the screen must be frequently scrolled up and down or changed over, which is inferior in operationality.

It is, therefore, general to print out desired information by a printer or transfer the information to a computer so that it is confirmed on a large screen.

In addition, although an inexpensive color ink jet printer has become recently widespread, its very low print speed makes it difficult to print out a large amount of document in color. However, a color copier or a color laser printer is still very expensive, it can not be readily purchased. Thus, it is general for a user to go to a service station equipped with a color copier and the like and ask for color copy.

However, since a number of service stations equipped with a color copier and the like is still restricted and prices or functions for that service are diverse, it is often the case that the color copy and the like can not be carried out under conditions desired by a user. In particular, since a user can not be aware of what kind of equipment each service station has, the user often can not utilize the service even though he/she wants that service. Additionally, the service station often can not effectively exploit the equipment provided to that station itself.

SUMMARY OF THE INVENTION

It is therefore an object of the present invention to provide an information input/output system capable of assuredly guiding a user to an optimum service station offering a service desired by the user.

To achieve this aim, the present invention provides an information input/output system for transmitting/receiving information through a communication network between at least one user terminal, at least one service station offering various services, and at least one service center managing each service station, the service station comprising:
candidate selecting means for selecting candidates for the service station capable of offering a service in accordance with the content of a request from the user terminal:
request transmitting means for transmitting a request from the user terminal to the service station selected from the selected candidates for the service station by the user terminal;
positional information transmitting means for transmitting to the user terminal information concerning a position of the service station selected by the user terminal;
route searching means for searching out a route from a current position of the user terminal or a designated position to the service station selected by the user terminal to determine an optimum route; and
display/output confirming means for confirming by the user terminal whether at least one of display and output of map information in the vicinity of the optimum route is executed, the user terminal comprising:
service requesting means for requesting a service to the service center;
station selecting means for selecting any from the candidates for the service station transmitted from the service station;
selection result transmitting means for transmitting to the service center information specifying the selected service station; and
display/output determining means for determining whether at least one of display and output of map information in the vicinity of the optimum route is executed.

According to the present invention, since the optimum route to the service station selected by the user terminal is displayed on the display of the user terminal in order to guide the user to this service station, the user can get to the optimum service station offering a service requested by the user in a short period of time.

BRIEF DESCRIPTION OF THE DRAWINGS

FIG. 11A is a view showing a searching result when a user specifies a given commercial product while

DESCRIPTION OF THE PREFERRED EMBODIMENTS

Figure 1:
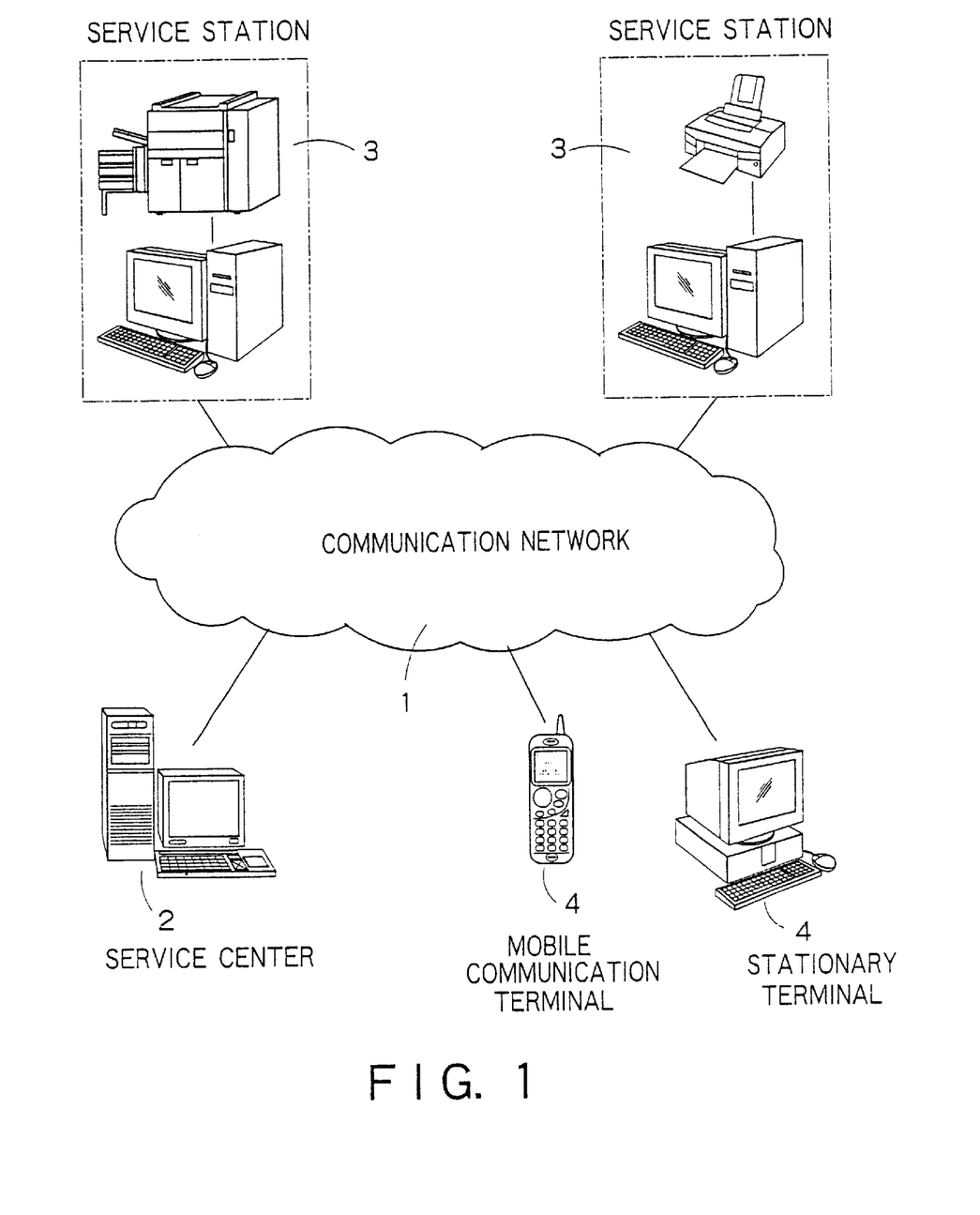
FIG. 1 is a block diagram showing an embodiment of an information input/output system according to the present invention.

FIG. 1 is a block diagram showing an embodiment of an information input/output system according to the present invention. The illustrated information input/output system includes: a service center 2 for offering various services through a communication network 1; a plurality of service stations 3 for transmitting/receiving information to/from the service center 2 through the communication network 1; and a user terminal 4 for transmitting/receiving information to/from the service center 2 or the service stations 3 through the communication network 1.

Figure 2:
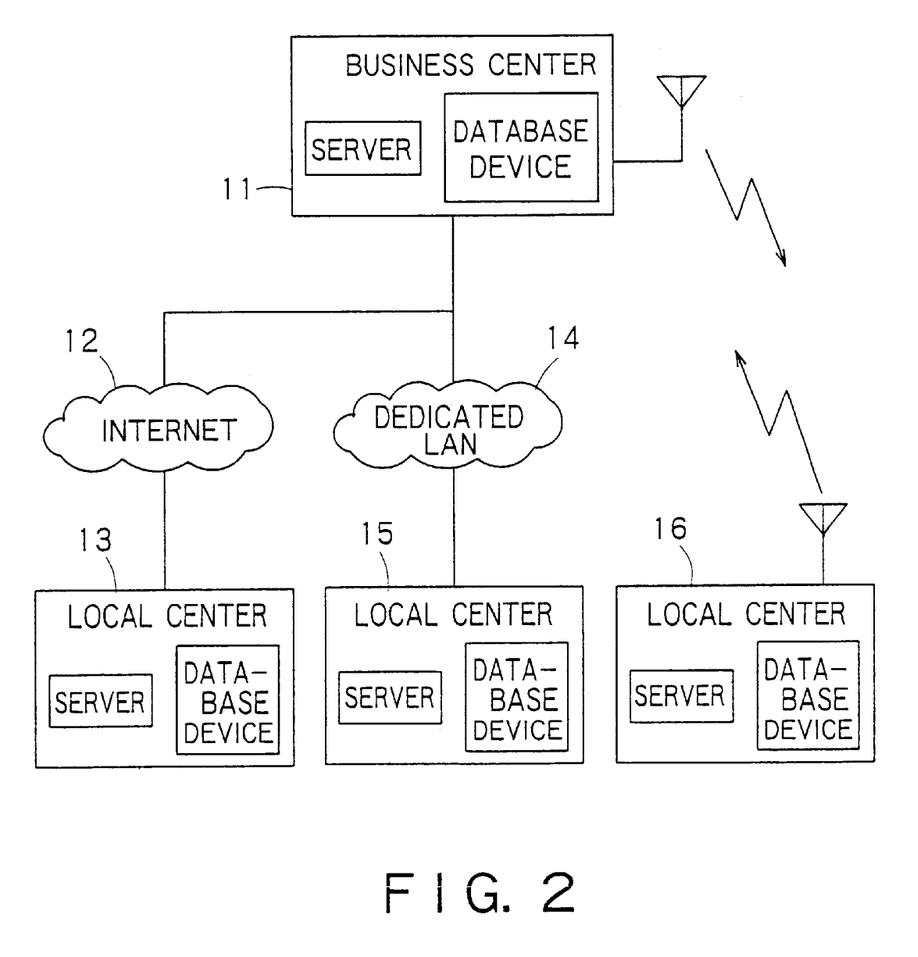
FIG. 2 is a block diagram showing a detailed structure of a service center 2.

FIG. 2 is a block diagram showing a detailed structure of the service center 2. As shown in the drawing, the service center 2 includes: a business center 11; a local center 13 for transmitting/receiving information to/from the business center 11; a local center 15 for transmitting/receiving information to/from the business center 11 through a dedicated LAN 14; and a local center 16 for transmitting/receiving information to/from the business center 11 through a radio line such as satellite communications and the like.

Three types of local centers 13, 15 and 16 shown in FIG. 2 are not necessarily a must, and only a part of them can be provided. Also, the service centers 2 do not have to be distributed to a plurality of servers and may be gathered up at a one location. Gathering the service centers at one location can simplify the structure of the service centers 2 to facilitate management of the database.

The database device in the service center 2 stores therein various information of, e.g., respective facilities or business conditions of the plural service stations 3. For example, FIG. 3 is a view showing an example of the information stored in the database device in the service center 2.

Figure 3:
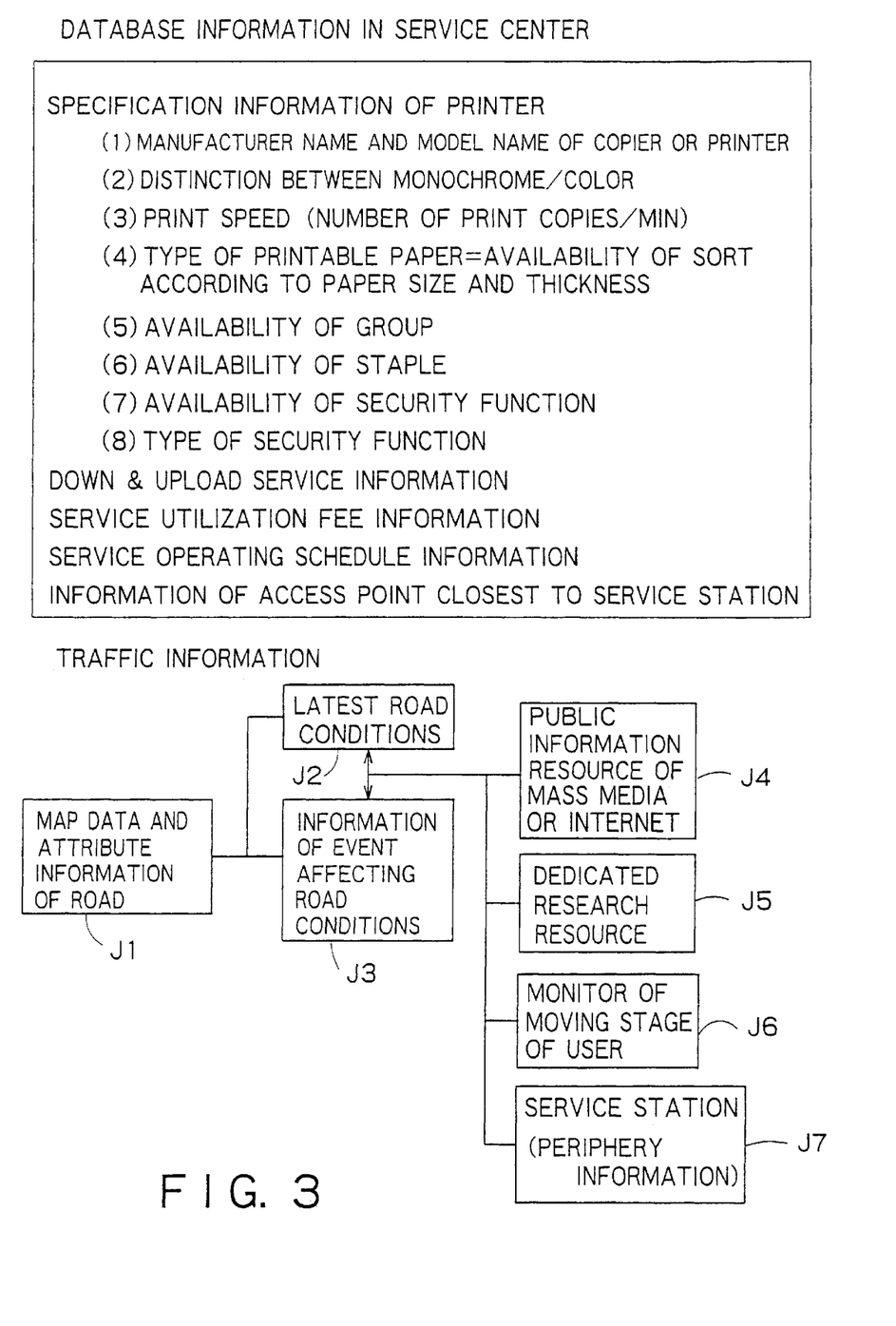
FIG. 3 is a view showing an example of information stored in a database device in the service center 2.

As shown in FIG. 3, the database device in the service center 2 stores therein specification information of devices provided to the service station 3, information concerning traffic used for navigation, down & upload service information, service utilization fee information, service operation schedule information, information of access points closest to the service station 3, and others.

The above-described specification information can be subdivided into and composed of, for example, (1) a manufacturer name or a model name of a copier or a printer, (2) discrimination between monochrome/color, (3) a print speed (a number of printed sheets per min), (4) a type of printable paper=availability of sorting based on a paper size and a thickness, (5), group availability, (6) stable availability, (7) security function enabled/disabled, and (8) a type of security function.

In addition, the information concerning traffic for navigation can be subdivided into and composed of, for example, map data and attribute information of roads (for example, distances or various restrictions) J1, latest road conditions J2, information of events affecting the road conditions J3, an open information resource of mass media or the internet J4, a dedicated research resource J5, monitor information of user movement states during use of a service J6, and information of the service station (surrounding information) and others.

The above-described event information J3 is information of vacancies of a parking lot at an event site or a number of visitors. The open information resource J4 is FM multiplex broadcasting providing traffic information or a specific web site on the internet. In addition, the monitor information J6 is information concerning a current position of the user and, when this information is used, the user can be informed of a traffic state around the current position of the user.

Since the utility value is increased as an amount of data stored in the database device in the service center 2 becomes large, new information can be additionally stored in the database device through the internet.

The information which can be newly stored in the database device includes the followings, for example.

1. Latest road traffic information or event information stored by a service provider through the internet or a dedicated information net.

2. Latest various kinds of information stored by only a registered user through the internet and the like.

3. Positional information of a user who owns a mobile communication terminal.

4. Various regional information transmitted from each service station.

5. Sales contents or special sale information of an event or a store.

Although the service center usually collects a registration fee from a business proprietor or a user who wants to store information to the database device, it is desirable to take off the registration fee in accordance with an amount of provided information in order to facilitate ampliation of database and offer of services. As a result, an amount of information stored in the database device can be satisfactory.

As a user terminal 4 shown in FIG. 1, there are two types, i.e., a stationary terminal such as a personal computer (PC) and a mobile communication terminal such as a cellular phone. The stationary terminal is connected to a communication network 1 through a wire line such as a telephone line or an ISDN line, and the mobile communication terminal is connected to the communication network 1 through a wireless line. Various kinds of network such as the internet or a LAN (Local Area Network) can be applied as a communication network 1.

The user terminal 4 requests various services to the service center 2 via the communication network 1. The service center 2 refers to the database device based on the content of the service request from the user terminal 4 or a location of the user terminal 4 and selects at least one candidate for the service station 3 so that the user terminal 4 is informed of the selected candidate for the service station 3 via the communication network 1.

Figure 4:
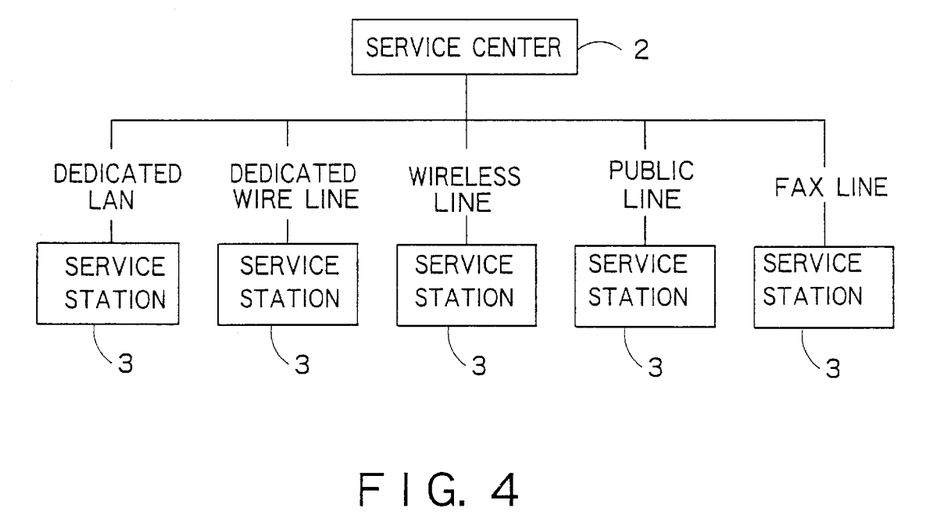
FIG. 4 is a view showing a connection state between a service center and a service station.

FIG. 4 is a view showing a connection state between the service center and the service station. As shown in the drawing, as the service station, there is one connected to the service center through a dedicated LAN as well as those connected to the service center through a wire dedicated line, a wireless line such as a satellite line, a public line such as a telephone line, or a FAX line.

Although facilities provided to each service station vary depending on each service station, each service station is equipped with a computer for data communications at lowest.

When print data is transmitted from the service center to the service station having a printer, that service station temporarily stores the print data in a memory and the like and thereafter transmits the print data to the printer to execute printing. The service station then directly hands or sends a printed matter to the user.

On the other hand, when the service center faxes to the service station having a FAX machine, that service station directly hands or sends the received FAX paper to the user.

Figure 5:
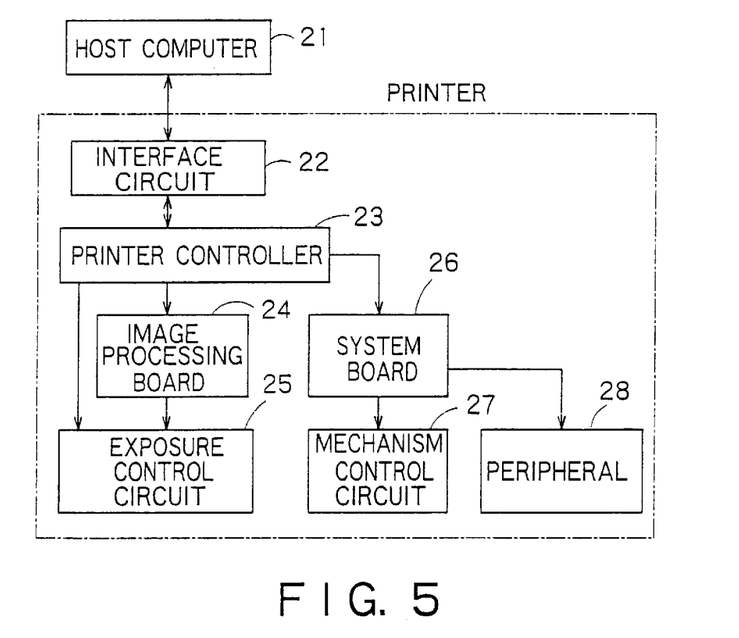
FIG. 5 is a block diagram showing a detailed structure of a printer provided in a service station.

FIG. 5 is a block diagram showing a schematic structure of a printer provided in the service station. The printer illustrated in FIG. 5 includes: an interface portion 22 for transmitting/receiving data to/from a host computer 21; a printer controller 23 for controlling the entire printer; an image processing board 24 for developing print data transmitted from the host computer 21; an exposure control circuit 25; a system board 26 for controlling a print portion such as a drum; a mechanism control circuit 27 for performing feed control of print paper or staple attachment control and the like; and a peripheral 28 such as a sorter.

Figure 6:
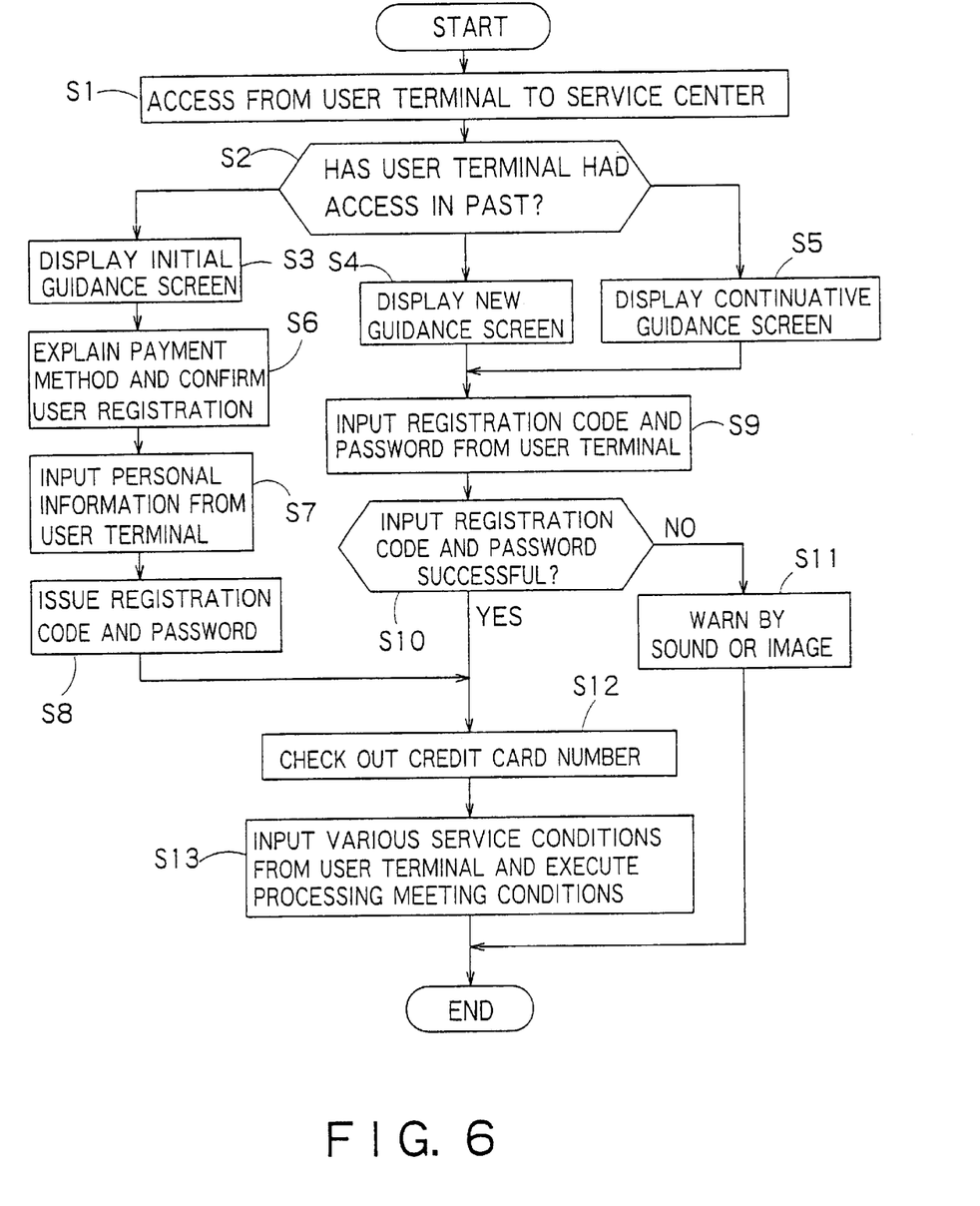
FIG. 6 is a flowchart showing a processing procedure of the information input/output system depicted in FIG. 1.

FIG. 6 is a flowchart showing the processing procedure of the information input/output system illustrated in FIG. 1. Description will now be given on the processing operation of the information input/output system of this embodiment with reference to the flowchart.

A user who wants the offer of services operates the user terminal to have access to the service center through the communication network such as the internet (step S1). Here, if the services center is distributed to a plurality of local centers 13, 15 and 16 as shown in FIG. 2, the closest service center 2 is accessed.

Subsequently, the service center makes a judgment on whether the user terminal has had access in past (step S2). The database device in the service center stores therein history information of accesses by each user terminal, and judgment is made as to whether the user terminal has had access by referring to this history information. The history information includes, for example, a date and a hour the user terminal had access, personal information of the user terminal, a service request content and accounting information.

When it is determined that the user terminal has access for the first time, an initial guidance screen is displayed (step S3). In addition, when the user terminal has had access in past but requests a new service, a new guidance screen is displayed (step S4). Further, when the user terminal again requests a service the user terminal requested in past, a continuative guidance screen is displayed (step S5).

When the initial guidance screen of the step S3 is displayed, the specific content of the service and explanation about the service utilization fee payment method are displayed on the user terminal, and confirmation is made as to whether user registration is carried out (step S6).

When the user desires user registration in response to the step S6, personal information such as an address, a name and others is inputted from the user terminal (step S7). The personal information is stored in the database device in the service center.

After receiving the personal information from the user terminal, the service center issues a registration code and a password (step S8) and stores the issued registration code and password in the database device. It is to be noted that the registration code and the password may be automatically issued but desired alphameric characters may be inputted by the user in advance. When the service center automatically issues the registration code and the password, it is desirable that they are encrypted to be transmitted to the user terminal or sent by mail and the like for security.

On the other hand, when the new guidance screen of the step S4 or the continuative guidance screen of the step S5 is displayed, the registration code and the password are first inputted from the user terminal (step S9).

The service center then checks out the registration code and the password (step S10). Here, if even one of the registration code and the password is found to be discrepant, the warning is given to the user terminal by means of sounds or images (step S11) and the processing is then completed.

On the other hand, when the registration code and the password are both successfully matched, or after the initial guidance screen of the step S3 or the new guidance screen of the step S4 is displayed in the case that the processing of the step S8 is completed, a credit card number that the user has is inputted from the user terminal by himself/herself, and the inputted credit card number is checked out (step S12). Incidentally, after displaying the continuative guidance screen of the step S5, since the credit card number information has been already encrypted to be stored in the database device in the service center, the processing of the step S12 is omitted.

Subsequently, various conditions of a service requested by the user are inputted from the user terminal (step S13). The service requested by the user can typically be (1) a route searching processing for carrying out search of a route to a predetermined place and navigation processing and (2) a target exhibition searching processing for performing search of a target designated by the user. Description will now be given on these (1) and (2).

Figure 7:
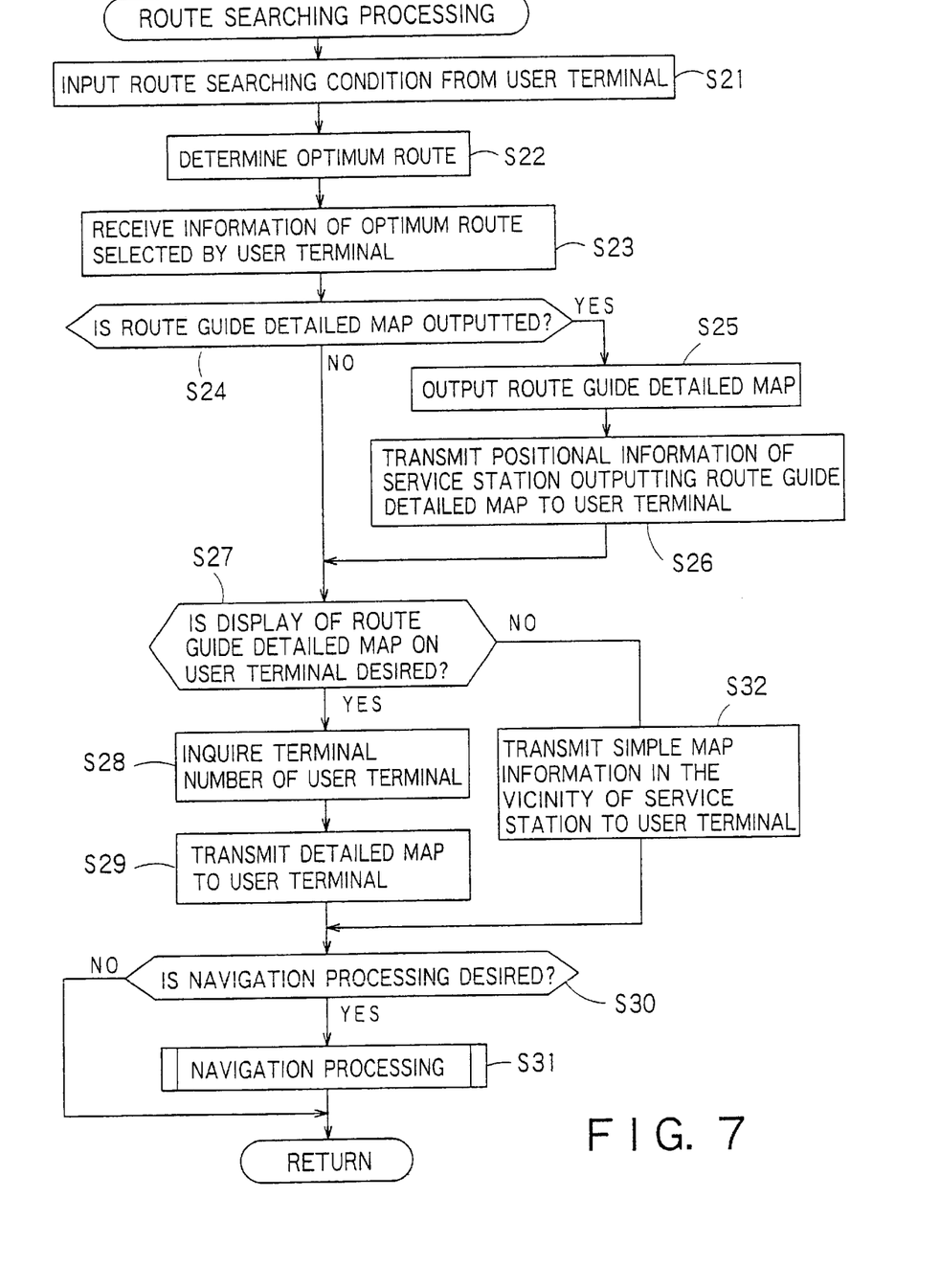
FIG. 7 is a flowchart showing a detailed processing procedure of route searching processing.

FIG. 7 is a flowchart showing a detailed processing procedure of the routs searching processing. At first, route searching conditions such as a place of departure, a destination or relay points (a number of them may be plural), a traffic route (for example, by car or on foot), a transportation expense, a traffic density, and a necessary time to a first service station, are inputted from the user terminal (step S21) Although there is no restriction in the route searching conditions inputted by the user, a route truly desired by the user can be provided to the user when inputting the detailed conditions as possible. conditions as possible.

For example, when the user selects a car, a type of car, fuel consumption and others may be inputted. Specifying a type of car can avoid a route with weight limits or height limits, and specifying fuel consumption can provide a route with the smaller fuel cost to the user.

The database device of the service center stores therein nationwide or main area map information in advance, and the service center searches out a route which can meet the route searching conditions inputted by the user in the step S21. The searched route is displayed on the display screen of the user terminal. Here, when it is impossible to narrow down to one route, several routes are displayed on the user terminal, and any one of them is selected by the user terminal (step S22). The route finally selected by the user is referred to as an optimum route hereinafter.

On receiving information of the optimum route finally selected by the user terminal (step S23), the service center inquires the user terminal as to whether the route guide detailed map is outputted (printed out) (step S24).

When the user answers that he/she wants the route guide detailed map to be outputted in response to this inquiry, the map:information is transmitted to the service station which outputs this map (step S25), and the information concerning a position of this service station is transmitted to the user terminal (step S26).

The route guide detailed map shows the map information indicating a current position of the user terminal to the service station which is a final destination of the user, and the optimum route is emphasized by a red line or a heavy line.

On the other hand, when the user answers that he/she does not want the route guide detailed map to be outputted in the step S24, an inquiry as to whether display of the route guide detailed map on the user terminal is desired is made (step S27). It is to be noted that the processing of the step S26 is executed only when the user terminal is a mobile communication terminal.

When the user answers that he/she wants the route guide detailed map to be displayed in response to this inquiry, the service center inquires about a terminal number of the user terminal (step S28) and then transmits the detailed map information to that terminal number (step S29).

Subsequently, the user determines whether he/she accepts a navigation service (step S30). When the navigation service is to be accepted, the later-described navigation processing is carried out with respect to this terminal number (step S31). On the other hand, when the user does not want to accept the navigation service, the processing of FIG. 7 is completed.

When the user answers that display of the route guide detailed map is not necessary in the step S27, the simple map information around the service station is transmitted to the user terminal (step S32), and there after the processing of the step S30 is executed. It is to be noted that the processing of the step S32 may be omitted.

Figure 8:
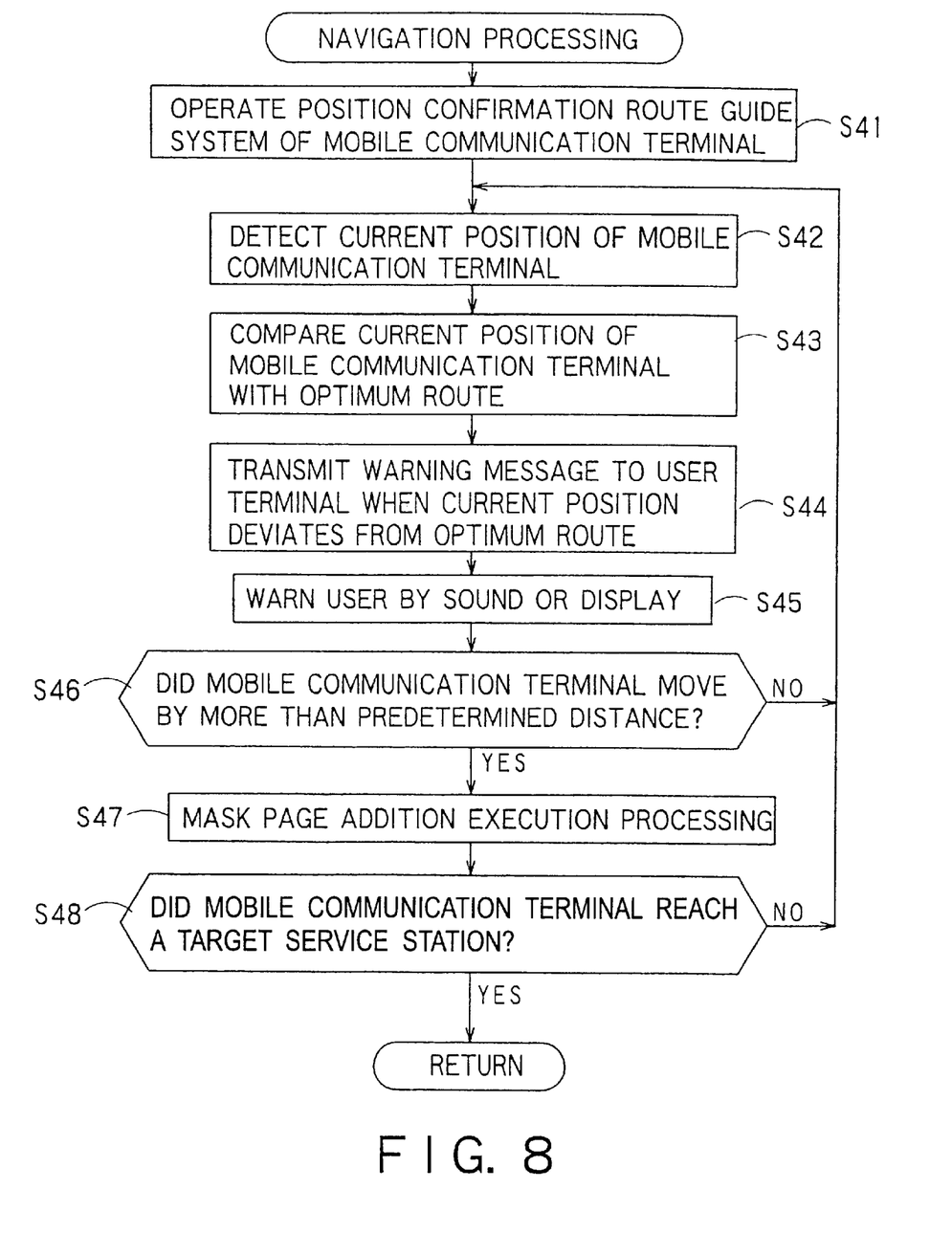
FIG. 8 is a detailed flowchart showing navigation processing of a step S29 in FIG. 7.

FIG. 8 is a detailed flowchart showing the navigation processing of the step S31 illustrated in FIG. 7. The service center first operates a position confirmation route guide system of a mobile communication terminal (assuming that the user terminal is a mobile communication terminal here) (step S41). This system has a function for receiving a signal from a base station which performs wireless communication with the mobile communication device. It periodically receives a signal from the base station and detects a current position of the mobile communication terminal (step S42).

The detected current position of the mobile communication terminal is compared with an optimum route which was finally determined in the step S22 depicted in FIG. 7 (step S43). When the current position of the mobile communication terminal deviates from the optimum route, a warning message is transmitted to the user terminal (step S44).

On receiving the warning message, the user terminal informs the user of deviation of the route by at least either a warning sound or a warning display (step S45). At this time the sound quality or the light emitting pattern may be changed in accordance with each route deviation direction or orientation in order that the user can easily grasp which direction the route deviates to. Further, the deviation direction may be shown by an arrow and the like on the display screen of the mobile communication device or the deviation direction may be indicated by an LED lamp and the like.

Figure 9A:
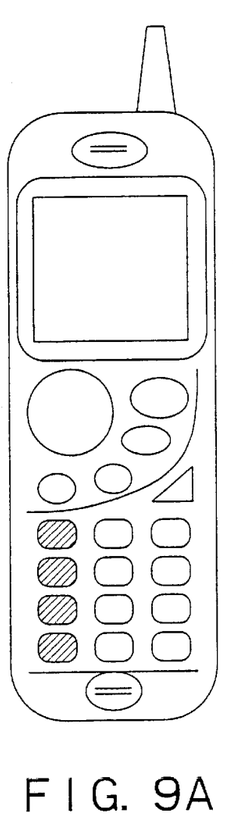
FIGS. 9A to 9C are views showing an example of display when a route is deviated.
Figure 9B:
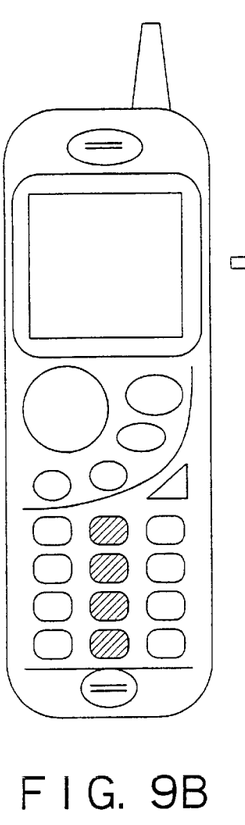
Figure 9C:
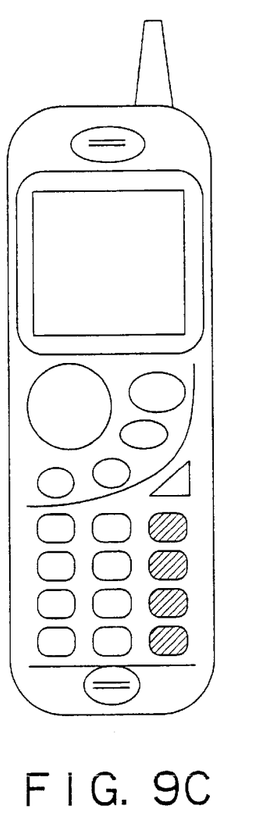

FIG. 9 is a view showing an example of the display state when the route deviates. In this example, dial keys of a mobile phone are sequentially lighted in the route deviation direction so that the user can easily grasp the route deviation direction. In FIG. 9, since the dial keys are smoothly lighted from the left side to the right side, it shows that the route deviates to the right side.

With the display such as shown in FIG. 9, the user can instantly grasp which direction the route deviates to.

Subsequently, a judgment is made as to whether the mobile communication terminal runs more than a predetermined distance after the previous transmission of the map information to the mobile communication terminal (step S46). When it runs more than a predetermined distance, the map information showing the vicinity of a current position of the mobile communication terminal is again transmitted (step S47). Also, when a lapsed time of the previous detection of a current position of the user terminal to the next detection exceeds a predetermined time, the map information is again transmitted.

A judgment is then made as to whether the mobile communication terminal reaches a target service station (step S48). Here, the judgment is based on a signal from the base station. If it is not yet to reach the service station, the processing of the step S42 and the following steps is repeated.

Figure 10:
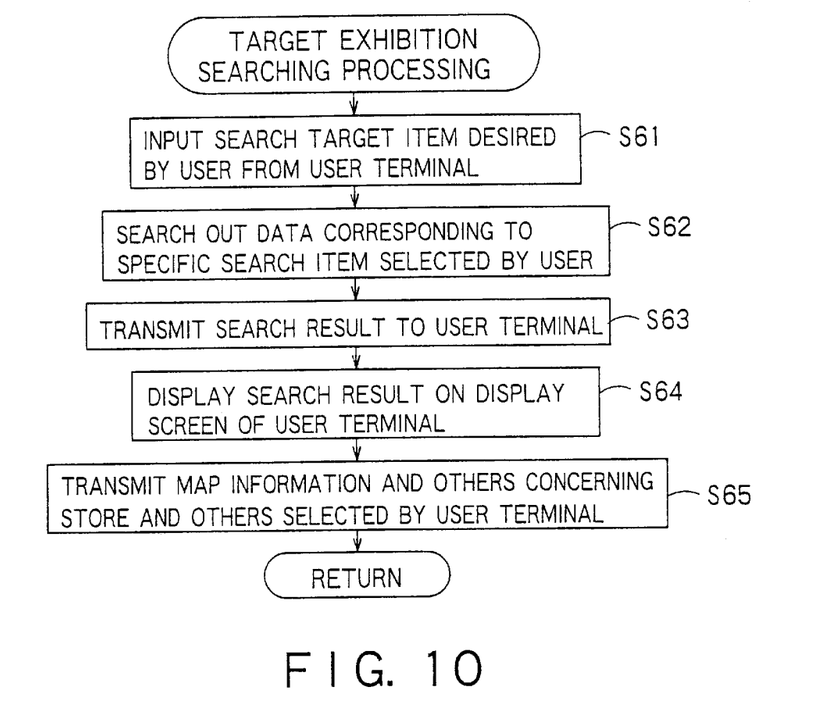
FIG. 10 is a flowchart showing a processing procedure executed when a user selects target exhibition searching processing in a step S13 of FIG. 6.

FIG. 10 is a flowchart showing the processing procedure executed when the user selects the target exhibition searching processing in the step S13 depicted in FIG. 6. A current position of the user, a moving area, and an item which is a search target desired by the user are first inputted from the user terminal (step S61). Here, there is not limit in items to be searched, and the items may be divided into several categories such as shopping, events, various services and others to be exhibited to the user. Further, several candidates for the category selected by the user may be listed up so that the user can select a specific search item. Alternatively, the specific search item may be directly inputted by the user via a keyboard and the like.

The service center searches out data corresponding to a specific search item selected by the user based on the input information from the user terminal with respect to the current position and the moving area of the user (step S62). Here, reference is made to the database device of the service center.

If search item is found, the search result is transmitted to the user terminal (step S63). The search result such as shown in FIGS. 11 is displayed on the display screen of the user terminal (step S64).

Figure 11A:
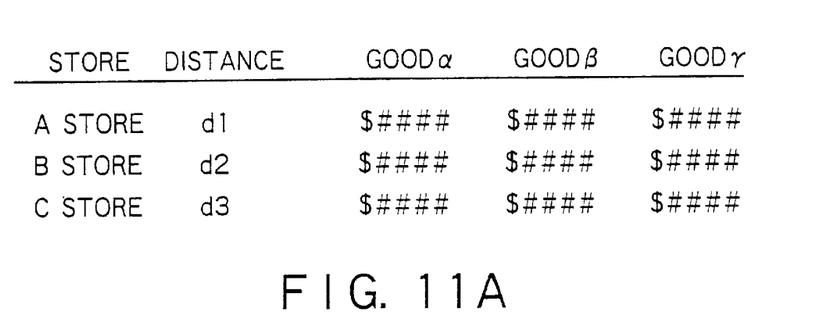

FIG. 11A shows an example where a store name, a distance from the current position, and a price of a commercial product on sale in that store are displayed as a search result when the user designates a specific commercial product. On the other hand, FIG. 11B shows an example where a store name, a distance from the current position and a price of haircut are displayed as a search result when the user specifies a hair salon.

Figure 11B:
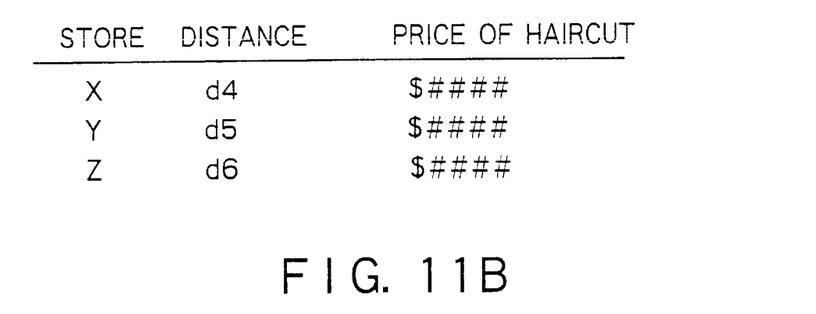
FIG. 11B is a view showing a searching result when a user specified a hair salon.

When the user selects a specific store on the screen depicted in FIGS. 11A and 11B, the service center transmits the map information and the like concerning the store to the user terminal (step S65). Here, the processing similar to the navigation processing in FIG. 7 may be conducted in order to guide the user to a store and the like desired by the user.

As described above, since not only the map showing the way to a destination is displayed but the detailed map and the route are printed out in this embodiment, the route can be easily understood with the printed map. In addition, since the optimum service station is selected in accordance with a request from the user and the user is guided to that service station, the user can reach that specific service station in a short period of time without going astray.

Moreover, if the optimum service station or the destination aimed by the user is distanced away, since a relay point is provided in the way of the route so that the detailed map information showing the vicinity of the relay point can be provided to the user, the user can be safely and assuredly guided irrespective of a position of the service station.

Furthermore, when the user performs search in accordance with a given target designated by himself/herself, information concerning a store and the like which can be matched with the target is displayed on the user terminal, and the user is guided to that store and the like. Therefore, the user can readily search out an optimum place which is matched with his/her target and reach that place without going astray.

Although the example where a current position of the user is automatically detected and the user is guided from the current position to a destination is given in the above-described embodiment, the map information may be displayed or printed with an arbitrary position designated by the user as a starting point instead of the current position.

Additionally, not only a destination is set but at least one relay point may be provided so that the user is guided along a route passing through the relay point.

The above-described processing of the flowcharts shown in FIGS. 6 to 8 may be implemented by hardware, software or a combination of hardware and software.

When the processing is implemented by software, a program for executing the processing procedure of FIG. 6 and others may be stored in a recording medium such as a floppy disk or a CD-ROM and read by a computer to be executed. The recording medium is not restricted to a portable medium such as a magnetic disk or an optical disk, and a stationary recording medium such as a hard disk drive or a memory may be employed.

The above-mentioned program may be distributed through a communication line (including wireless communications) such as the internet. Further, the above program may be encrypted, modulated or compressed to be distributed via a wire line such as the internet or a wireless line, or stored in a recording medium for distribution.

What is claimed is:

1. An information input/output system which transmits and receives information through a communication network between at least one user terminal, at least one service station which offers various services, and at least one service center which manages each of said service station, said service center comprising:
a candidate selector which selects candidates for a first service station capable of providing a service in accordance with content of a request from said user terminal;
a request transmitter which transmits the request of said user terminal to said first service station selected by said user terminal from said selected candidates for said first service station;
a positional information transmitter which transmits, to said user terminal, information concerning a position of said first service station;
a route searching part which searches out an optimum route from a current position of said user terminal or a designated position to said first service station; and
a display/output confirming part which confirms by said user terminal whether map information in the vicinity of said optimum route is displayed or outputted;

said user terminal comprising:
a service requesting part which requests a service to said service center;
a station selector which selects any from said candidates for said first service station transmitted from said service center;
a selection result transmitter which transmits, to said service center, information for designating said selected first service station;
a display/output determining part which determines whether map information in the vicinity of said optimum route is displayed or outputted;

wherein said service center comprises:
a relay position selector which selects a second service station in a vicinity of said optimum route for outputting said map information, when being confirmed that said user terminal wants the output of said map information in the vicinity of said optimum route; and
map information transmitter which transmits said map information in the vicinity of said optimum route to said second service station selected by said relay position selector.

2. The information input/output system according to claims 1, wherein said service center comprises map information transmitter which transmits said map information in the vicinity of said optimum route to said user terminal, when being confirmed that said user terminal wants the display of said map information in the vicinity of said optimum route.

3. The information input/output system according to claim 2, wherein said user terminal comprises map display controlling means for displaying, on a display unit, said map information in the vicinity of said optimum route transmitted from said service center.

4. The information input/output system according to claim 3, wherein said map display controlling means emphatically displays said optimum route.

5. The information input/output system according to claim 2, further comprising a position detector which detects a current position of said user terminal,
said map information transmitter transmitting, to said user terminal, said map information in the vicinity from said optimum route of a current position of said user terminal to said first service station selected by said user terminal, every time said user terminal moves a predetermined distance.

6. The information input/output system according to claim 5, wherein said position detector again detects a current position of said user terminal, when a moving distance of said user terminal exceeds a predetermined distance or when a lapsed time of the previous detection of a current position of said user terminal to the next detection exceeds a predetermined time.

7. The information input/output system according to claim 1, wherein said relay position selector shows and selects said second service station at which said user terminal stops to pick up the map to said first service station during moving along said optimum route, if a distance from the current position of said user terminal to a destination or said first service station selected by said user terminal is farther than a predetermined distance; and
wherein said service center further comprises:
a relay information provider which provides said user terminal with map information from the current position of said user terminal to said second service station.

8. The information input/output system according to claim 7, wherein said relay information provider transmits, to said second service station, map information showing the optimum route from said second service station to said first service station selected by said user terminal.

9. The information input/output system according to claim 1, wherein said service center comprises:
an out-of-route judging part which judges whether a current position of said user terminal deviates from said route searched out by said route searching part; and
a warning transmitter which transmits warning information to said user terminal, when the deviation from said route is determined.

10. The information input/output system according to claim 9, wherein said user terminal comprises warning means for performing warning by at least one of an optical signal and a sound signal, when receiving said warning information from said service center.

11. The information input/output system according to claim 10, wherein said warning means executes the warning in such a manner that an out-of-route direction is comprehensible.

12. The information input/output system according to claim 1, wherein said route searching part determines said optimum route based on at least one of transportation route, a transportation expense, a traffic density and a necessary time to said first service station.

13. The information input/output system according to claim 1, wherein at least a part of said first service station comprises:
   a printer which prints data requested from said user terminal; and
   a FAX receiver which receives data transmitted from said service center by fax, the received data being delivered to a user without making a hard copy.

14. An information input/output method for transmitting and receiving information through a communication network between at least one user terminal, at least one service station which offers various services, and at least one service center which manages each of said service station, said method comprising:
   requesting a service from said user terminal to said service center;
   selecting candidates for a first service station capable of providing a service in accordance with the content of the request from said user terminal;
   transmitting said selected candidates for said first service station from said service center to said user terminal;
   selecting any from said candidates for said first service station transmitted from said service center;
   transmitting information for designating said selected first service station to said service center;
   searching out an optimum route from a current position of said user terminal to said first service station selected by said user terminal;
   confirming by said user terminal whether map information in the vicinity of said optimum route is displayed or outputted;
   selecting a second service station for outputting said map information, when being confirmed that said user terminal wants the output of said map information in the vicinity of said optimum route; and
   transmitting said map information in the vicinity of said optimum route to the selected second service station.

15. A recording medium recording therein a program for transmitting and receiving information through a communication network between at least one user terminal, at least one service station for offering various services, and at least one service center for managing each of said service station, said medium comprising a program for executing;
   requesting a service from said user terminal to said service center;
   selecting candidates for a first service station capable of providing a service in accordance with the content of the request from said user terminal;
   transmitting said selected candidates for said first service station from said service center to said user terminal;
   selecting any from said candidates for said first service station transmitted from said service center;
   transmitting information for designating said selected first service station to said service center;
   searching out an optimum route from a current position of said user terminal to said first service station selected by said user terminal;
   confirming by said user terminal whether map information in the vicinity of said optimum route is displayed or outputted;
   selecting a second service station for outputting said map information, when being confirmed that said user terminal wants the output of said map information in the vicinity of said optimum route; and
   transmitting said map information in the vicinity of said optimum route to the selected second service station.

* * * * *